United States Patent Office 2,798,184
Patented July 2, 1957

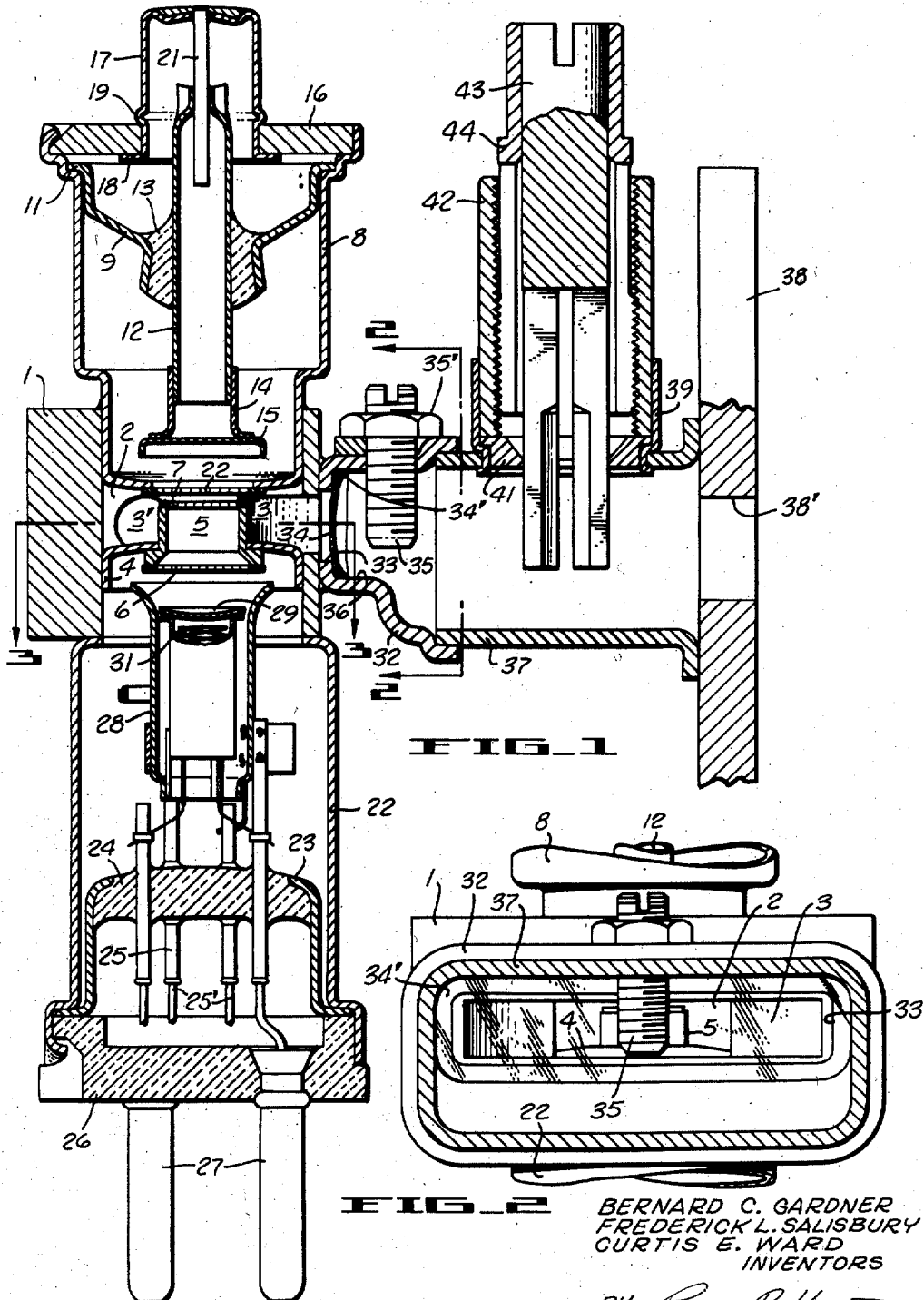

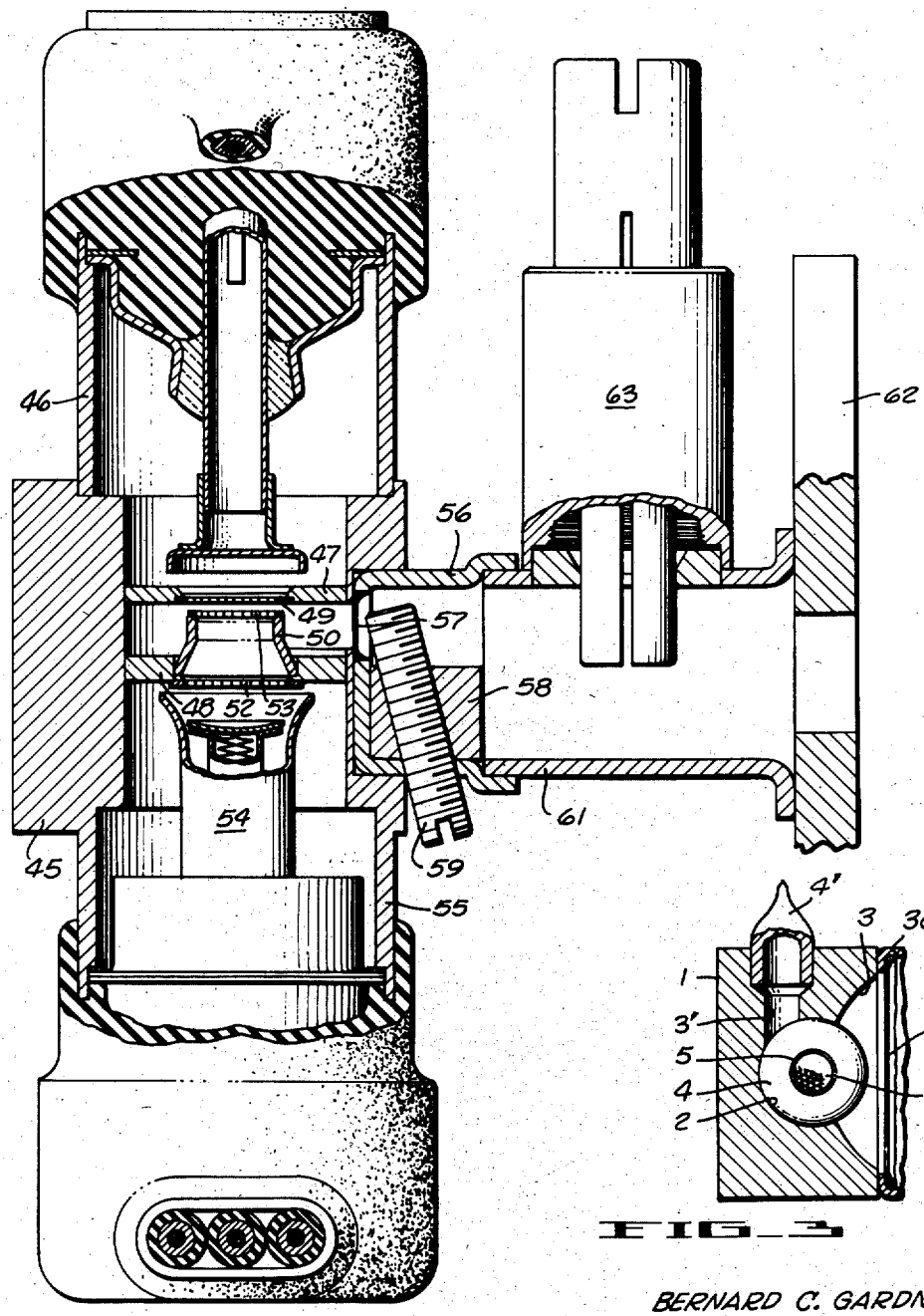

2,798,184
ELECTRON TUBE APPARATUS

Bernard C. Gardner and Frederick L. Salisbury, Los Altos, and Curtis E. Ward, Palo Alto, Calif., assignors to Varian Associates, San Carlos, Calif., a corporation of California Application August 18, 1955, Serial No. 529,168

11 Claims. (Cl. 315—5.19)

This invention relates generally to ultra-high frequency velocity-modulation tube apparatus and the invention has reference, more particularly, to a novel reflex klystron tube of the tunable external cavity type.

The particular type of klystron to which the present invention relates is an internal-external cavity type wherein the tunable external cavity resonator is outside the vacuum envelope of the klystron device and is coupled to the internal cavity resonator through a wave-energy permeable vacuum seal. This internal-external cavity type of klystron eliminates the heretofore necessary flexing or diaphragm type of mechanical tuning in which the flexed portion, usually a thin, weak membrane, necessarily served as a part of the vacuum envelope.

The present invention has for its object the provision of a novel internal-external cavity type of klystron having improved structural characteristics including novel internal cavity and external cavity construction.

One feature of the present invention is the provision of a novel klystron device having a main body portion which is a machined block of metal to insure strength and rigidity, the block being so adapted as to be rapidly and inexpensively machined, suitable for mass production construction, yet readily adaptable for cooperation with external cavity bodies.

Still another feature of the present invention is the provision of a novel external cavity body specially adapted for iris coupling to the internal cavity portion of the reflex klystron structure, this cavity body having a two-stepped internal configuration, the step therein serving to cooperate with screw means for iris or window loading between the internal and external cavity resonator.

Another feature of the present invention is the provision of a vacuum-sealed iris window coupling the internal cavity resonator with the external cavity resonator which is sealed into the inner end of the waveguide type external cavity resonator rather than in the iris opening in the internal cavity resonator body, the waveguide being brazed to the internal cavity resonator body at the iris opening.

Still another feature of the present invention is the provision of a novel electron discharge device in which a cavity resonator is formed by utilizing two opposed cup-shaped members inserted into a cylindrical bore in a solid block body, the cup-shaped members having re-entrant tube members and resonator grids mounted thereon.

These and other objects and advantages will become apparent from a perusal of the following specification taken in connection with the accompanying drawings wherein—

Fig. 1 is a longitudinal section view of a novel reflex klystron of the internal-external cavity type which embodies the present invention, Fig. 2 is a section view of the novel klystron of Fig. 1 taken along section line 2—2 through the external cavity looking at the iris coupling window, Fig. 3 is a transverse section view of the main body block in Fig. 1 taken along section line 3—3, and Fig. 4 is a view, partly in longitudinal section, of another reflex klystron device which embodies the improvements of the present invention.

Referring now to Figs. 1, 2 and 3, inclusive, there is shown a reflex klystron which comprises a main or central body portion 1 which, in the present instance, is a rectangular block of steel having a large longitudinal bore 2 located slightly off center therein, there being a curved cut or iris opening 3 in one side of the block 1 opening into the bore 2. This iris opening may be rapidly made by one milling operation, the iris opening taking the shape of an arc of a circle or a disk which is slightly less than a semicircle in size (Fig. 3). An exhaust bore 3' extends into the bore 2, a pinch-off tube 4' being brazed into the bore 3'. It should be noted that this iris opening 3 may be cut into the block by a rotating milling operation, the walls of the opening forming the arc of a circle, which is more conveniently made than the heretofore rectangular type of iris openings.

A cup-shaped header 4, having a substantially cylindrical re-entrant tube 5 secured within a centrally located opening therein, is secured as by brazing within the bore 2 of the central body portion 1. This header 4 and re-entrant tube 5 are made of a suitable metal such as steel. Secured over the open ends of the re-entrant tube 5 are an accelerator grid 6 and a resonator grid 7 which, in the present embodiment, are circular copper-hex grids.

A reflector assembly is secured within the main body bore at one end thereof, this reflector assembly comprising a hollow, substantially cylindrical reflector bulb 8 with a cup-shaped inner end which is stamped from sheet metal. The reflector bulb 8 has a reflector mounting cup 9 vacuum sealed within the open end thereof by means of a flange 11 on the cup 9. A reflector post 12 is fixedly mounted on the reflector cup 9 by a suitable insulator and vacuum seal 13 such as glass. Secured on the inner end of the reflector post 12 by a small eyelet 14 is a shallow cup-shaped reflector button 15. The post 12, eyelet 14, and button 15 in the present embodiment were spot welded together.

An insulating plastic member 16 is secured within the outer open end of the reflector bulb 8 by crimping therein. A reflector cap 17, which, for example, may be of brass, is mounted within a central opening in the plastic base by a flange 18 and ridge 19. A conducting lead 21 is crimped and brazed into the end of the reflector post 12 and electrically connects with the reflector cap 17. A second resonator grid 22 is secured over the inner open end of the bulb 8. The positions of the cup-shaped inner end of the bulb 8 and the cup-shaped header 4 in the bore 2 determine the size of the internal cavity resonator and the gap spacing between the resonator grids 7 and 22. By relative adjustments of the header 4 and bulb 8 before final brazing, the size of the internal cavity resonator and/or its position relative to the iris opening 3 may be carefully selected.

A cathode assembly is secured to the body 1 at the other end of the bore 2. This cathode assembly comprises a stamped sheet-metal cathode bulb 22, which is brazed to the main body block 1. A cathode mounting cup 23 is vacuum sealed within the cathode bulb 22, the inner end of the cup 23 being vacuum sealed by a suitable insulating material such as glass 24. Mounted within the glass seal 24 are mounting stems 25 to which are secured leads 25'. A base 26 of an insulating material such as plastic is secured within the outer end of the cathode bulb 22 as by crimping, the base 26 having prongs 27 secured therein to which the outer ends of the leads 25' are secured. Mounted on the mounting stems 25 within the cathode bulb 22 is a cathode assembly comprising a substantially cylindrical focusing electrode and heat shield 28, a cathode button 29 which may be made of nickel having a suitable electron emissive coating thereon, and heater filament 31.

Mounted as by brazing on the main body block 1 over the iris opening 3 is a waveguide adapter or cup 32, which may be stamped from sheet metal. This waveguide adapter 32 is a multi-stepped, substantially rectangular cup having an opening 33 in its end larger than but conforming to the iris opening 3, the opening 33 being framed by an inwardly directed flange. Vacuum sealed on the flange as by a glass fillet 34' within the waveguide adapter cup 32 over the opening 33 therein is a sheet 34 of wave-energy permeable material such as mica. Threaded through one wall of the adapter 32 is an iris or window loading screw 35 which cooperates with the stepped surface 36 for electrical window loading purposes. Secured as by brazing within the outer end of the cup 32 is a rectangular waveguide section 37 having a mounting flange 38 secured as by brazing on the outer end thereof, the waveguide flange having a circular output opening 38' located therein. Secured within a bore in the upper surface of this waveguide section 37 is a tuner mounting sleeve 39 which carries a split-rod tuner assembly including a bearing 41, tuner sleeve 42, split-end tuner rod 43, and tuner screw 44. This tuner assembly is fully described in co-pending U. S. patent application entitled "High Frequency Cavity Resonator Tuner Structure" bearing Serial Number 521,947 filed in the names of Donald L. Snow and Peter H. Kafitz on July 14, 1955.

In operation, electrons emitted from the cathode 29 due to the heating of the cathode by the filament 31 are focused into a beam by the focusing electrode 28 and accelerated through the klystron by high positive voltages on the accelerator electrode 6. In accordance with well-known klystron reflex action, the electrons pass through the resonator gap between grids 7 and 22 where they interact with the R. F. electric field across the gap, the R. F. field velocity-modulating the beam. The electrons pass into the space adjacent the reflector electrode 15 which carries a negative potential adapted to repel the electrons in the beam. The electrons are turned about and again pass through the resonator gap between grids 7 and 22, the electrons passing through in bunches due to the velocity modulation effect which took place in the electron beam. The bunched electrons deliver energy to the field across the resonator gap, the R. F. energy being removed from the cavity resonator through the iris opening 3 and the output waveguide section 37. The window loading screw 35 is adjusted to produce a capacity loading across the window to thereby obtain an optimum coupling between the interval re-entrant cavity resonator and the external cavity resonator formed by the output waveguide sections 32, 37. After the optimum or "heavy" coupling is obtained, the screw 35 may be locked in place by its lock nut 35'.

The klystron may be tuned over its operating frequency range by means of the tuner rod 43 in the external cavity resonator. The capacity value of the external cavity formed by the waveguide section 37 is varied by means of the controlled spacing of the end of the rod 43 from the lower wall of section 37.

The radio frequency energy passes out from the external cavity resonator through the waveguide flange opening 38' into the external load circuits.

Referring now to Fig. 4, there is shown a slightly more rugged reflex klystron which is suitable for more abusive usage. The body of this klystron comprises a machined block of metal 45 and a hollow metal cylinder 46 brazed together to form a solid metallic body. The metallic annular headers 47 and 48 are brazed within the block 45, forming the end walls of the internal cavity resonator and mounting the resonator grid 49 and the re-entrant tube 51 and associated accelerating grid 52 and resonator grid 53, respectively. The cathode assembly 54 is secured within one end 55 of the body portion and the reflector 56 is secured in axial alignment therewith within the opposite body portion 46. An iris opening is located in the body block 45 at the internal resonator section, a recess in the body block 45 accommodating the waveguide adapter 56 which has the output window 57 vacuum sealed therein at the iris opening in the body. A solid block of metal 58 is brazed within the waveguide adapter 56 for reducing the waveguide volume at the iris window which, in combination with the coupling screw 59, produces an optimum capacity loading across the window for coupling between the internal resonator portion and the external tunable cavity resonator. The external cavity resonator waveguide section 61 and associated output waveguide flange 62 and external tuning structure 63 is mounted on the waveguide adapter 56.

In prior internal-external cavity resonator klystron devices of this type, the iris window vacuum seal was sealed in the body of the klystron and the external resonator was then secured to the body over the iris opening. In the present embodiment shown in Fig. 1, however, the vacuum seal 34, in this instance mica, is vacuum sealed within the end of the waveguide adapter portion 32 serving as a part of the external cavity resonator and the end of the waveguide adapter in turn is vacuum sealed to the main body portion 1 over the iris opening 3. In this manner, the window vacuum seal 34 may be made much larger than the iris opening in the body. Increasing the size of the mica results in an ease in handling and in sealing the window. For example, the glass 34' used to vacuum seal the mica window within the metallic waveguide may be allowed to creep onto the outer edges of the mica to some extent without overlapping onto the area of mica coinciding with the iris opening. This permits the use of greater amounts of sealing glass with a resultant stronger seal. Also, by using larger windows, clearances and tolerances may be made larger.

Since many modifications in and variations from the described apparatus may be made without departing from the spirit of the invention, the foregoing embodiment of the invention is to be considered as exemplary and not in a limiting sense.

What is claimed is:

1. An electron discharge device comprising a main body member means adapted to produce an electron beam within said body member and a first cavity resonator positioned within said body member in the beam path for electromagnetic interaction with the electron beam, said body member having an iris opening in the wall thereof into said cavity resonator, a second body member forming a second cavity resonator having a flanged end portion with an iris opening therein, said second body member being vacuum sealed on said main body at said flanged end, said second cavity resonator being heavily coupled through said flanged iris opening therein and said first iris opening to said first cavity resonator, and a wave-energy permeable material vacuum sealed in said second body member on said flanged portion and sealing the first cavity resonator from said second cavity resonator.

2. An electron discharge device as claimed in claim 1 wherein the iris opening in said flanged end of the second body member through which said second cavity resonator is coupled to said first cavity resonator is larger than and aligned with said iris opening in the wall of said first body member.

3. An electron discharge device as claimed in claim 1, wherein the second body member forming said second cavity resonator has a multi-step configuration at the iris opening end, the size of the second cavity resonator being smaller at the iris and stepping up to a larger dimension at a point slightly removed from the iris, and a metallic member secured in the cavity resonator at the smaller volume portion for capacitive interaction with the wall of the cavity resonator at the iris opening whereby the window may be electrically loaded.

4. An electron discharge device as claimed in claim 3, wherein said second body member forming the second cavity resonator includes a rectangular section of waveguide, the multi-step configuration being formed in the second cavity resonator by a block of metal positioned in the waveguide adjacent the iris opening in the waveguide, the metal block and said metallic member forming the capacitive loading at the iris opening between the first and second cavity resonators.

5. An electron discharge device comprising a main body member means adapted to produce an electron beam within said body member and means forming a cavity resonator within said body member positioned in the beam path for electromagnetic interaction with the electron beam, said body member having an iris opening leading into said cavity resonator, a hollow second cavity resonator body member having an iris opening in one side thereof, said second body member being vacuum sealed in abutting relationship on said first body member with the iris openings in alignment whereby said second cavity resonator is heavily coupled to said first cavity resonator through said iris openings, and a wave-energy permeable material vacuum sealed within the second body member cavity resonator chamber over said iris opening.

6. A reflex klystron comprising a main body member means adapted to produce an electron beam within the body member and an internal cavity resonator positioned in the beam path for electromagnetic interaction with the electron beam, said cavity resonator having an iris opening leading therefrom through said body member, an external cavity resonator heavily coupled to said internal cavity resonator comprising a rectangular waveguide member abutting said main body member having an opening in one end thereof substantially larger than but adapted to align with the iris opening leading from the internal cavity resonator, and a wave-energy permeable material vacuum sealed within said rectangular waveguide member over said opening in said one end, the material vacuum sealing the external cavity resonator from the internal cavity resonator.

7. An electron discharge device comprising means adapted to produce an electron beam within the device, a first cavity resonator positioned in the device for interaction with the electron beam, said cavity resonator having an iris opening in the wall thereof, a second cavity resonator vacuum sealed to the wall of said first cavity resonator, said second cavity resonator having an iris opening aligned with the iris opening in said first cavity resonator, a wave-energy permeable material over said openings vacuum sealing the first cavity resonator from said second cavity resonator, said second cavity resonator having a multi-stepped wall portion adjacent the iris opening, and a metallic member secured in the second cavity resonator for capacitive interaction with the step at the iris opening whereby the window will be electrically loaded.

8. An electron discharge device comprising means adapted to produce an electron beam within the device, a first cavity resonator positioned in the device for interaction with the electron beam, said cavity resonator being partially formed by a block of conducting metal having a longitudinal bore therein, the walls of said bore forming a portion of the boundary walls of the cavity resonator, said cavity resonator having an iris opening through the wall of said metallic block entering into the cavity resonator portion, the iris opening being substantially semi-circular shaped, the opening intersecting with the cavity resonator volume over a small arc portion of said iris opening.

9. An electron discharge device comprising means adapted to produce an electron beam within the device, a first cavity resonator positioned in the device for interaction with the electron beam, said cavity resonator being partially formed by a block of conducting metal having a longitudinal bore therein, the walls of said bore forming a portion of the boundary walls of the cavity resonator, said cavity resonator having an iris opening through the wall of said metallic block entering into the cavity resonator portion, the iris opening being substantially semi-circular shaped, the opening intersecting with the cavity resonator volume over a small arc portion of said iris opening, a second cavity resonator vacuum sealed to the wall of said first cavity resonator, said second cavity resonator having an iris opening coinciding with the iris opening in said first cavity resonator, a wave energy permeable material vacuum sealing the first cavity resonator from said second cavity resonator vacuum sealed in second cavity resonator over the iris opening therein, said second cavity resonator having a multi-step configuration at the iris opening end, the size of the second cavity resonator being smaller at the iris and stepping up to a larger dimension at a point slightly removed from the iris, and a metallic member secured in the cavity resonator at the smaller volume portion for capacitive interaction with the wall of the cavity resonator at the iris opening whereby the window may be electrically loaded.

10. An electron discharge device comprising a main body member having a cylindrical bore extending longitudinally therein, means positioned within said bore for forming a cavity resonator therein, said main body member having an opening in one side thereof adapted to form an iris opening leading into said cavity resonator, said means for forming said cavity resonator comprising a first cup-shaped member within the bore of said main body member, said cup-shaped member having a resonator grid thereon over an opening in the end wall of said member, and a second cup-shaped member having a second resonator grid mounted over an opening therein within the bore in said main body, one of said cup-shaped members extending out from one end of said bore, said two cup-shaped members and resonator grids being spaced apart and serving with the walls of said bore to form the cavity resonator within the body, the size of the cavity resonator and the position of said resonator relative to said iris opening being determined by the relative position of the two cup-shaped members within the main body portion.

11. In an electron discharge device comprising a main body member having a cylindrical bore extending longitudinally therein, means positioned within said bore for forming a cavity resonator therein, said main body member having an opening in one side thereof adapted to form an iris opening leading into said cavity resonator, said means for forming said cavity resonator comprising a first cup-shaped member within the bore of said main body member, said cup-shaped member having a resonator grid thereon over an opening in the end wall of said member, a second cup-shaped member having a second resonator grid mounted over an opening therein within said bore in said main body, one of said cup-shaped members extending out from one end of said bore, said two cup-shaped members and resonator grids being spaced apart and serving with the walls of said bore to form the cavity resonator within the body, the size of the cavity resonator and the position of said resonator relative to said iris opening being determined by the relative position of the two cup-shaped members within the main body portion, a second body member forming a second cavity resonator and having an iris opening in one side thereof, said second body member being vacuum sealed in abutting relationship on said first body member with the iris openings in alignment whereby said second cavity resonator is heavily coupled to said first cavity resonator through said iris openings, and a wave energy permeable material vacuum sealed over said iris openings.

References Cited in the file of this patent

UNITED STATES PATENTS

| | | |
|---|---|---|
| 2,501,052 | Herlin | Mar. 21, 1950 |
| 2,508,346 | Lafferty | May 16, 1950 |
| 2,601,539 | Marcum | June 24, 1952 |

U. S. DEPARTMENT OF COMMERCE
PATENT OFFICE

CERTIFICATE OF CORRECTION

Patent No. 2,798,184                               July 2, 1957

Bernard C. Gardner et al.

It is hereby certified that error appears in the printed specification of the above numbered patent requiring correction and that the said Letters Patent should read as corrected below.

Column 4, line 40, claim 1, column 5, line 6, claim 5, and line 20, claim 6, after "member", each occurrence, insert a comma.

Signed and sealed this 29th day of April 1958.

(SEAL)

Attest:

KARL H. AXLINE
Attesting Officer

ROBERT C. WATSON
Commissioner of Patents